US010669685B1

(12) United States Patent
Hogan

(10) Patent No.: US 10,669,685 B1
(45) Date of Patent: Jun. 2, 2020

(54) SOIL MODIFICATION APPARATUSES AND METHODS OF USING THE SAME

(71) Applicant: Christopher Hogan, Wonder Lake, IL (US)

(72) Inventor: Christopher Hogan, Wonder Lake, IL (US)

(*) Notice: Subject to any disclaimer, the term of this patent is extended or adjusted under 35 U.S.C. 154(b) by 0 days.

(21) Appl. No.: 16/254,726

(22) Filed: Jan. 23, 2019

(51) Int. Cl.
*E02D 3/12* (2006.01)
*B62D 49/08* (2006.01)
*B62D 55/06* (2006.01)

(52) U.S. Cl.
CPC ............ *E02D 3/12* (2013.01); *B62D 49/085* (2013.01); *B62D 55/06* (2013.01)

(58) Field of Classification Search
CPC combination set(s) only.
See application file for complete search history.

(56) References Cited

U.S. PATENT DOCUMENTS

| 5,031,973 A * | 7/1991 | Gillet | B62D 49/08 305/132 |
| 8,696,244 B2 * | 4/2014 | Keylor | B09B 1/00 37/407 |
| 10,076,775 B1 * | 9/2018 | Eng | B65H 16/00 |

* cited by examiner

*Primary Examiner* — Kyle Armstrong
(74) *Attorney, Agent, or Firm* — Scherrer Patent & Trademark Law, P.C.; Stephen T. Scherrer; Monique A. Morneault

(57) ABSTRACT

Apparatuses are configured to modify wet subgrades prepare the same for constructions, namely for building roads and/or buildings thereon. The soil modification apparatuses spread mineral material from a truck having increased traction for maneuvering over the wet subgrades. Methods of using the same are further provided.

17 Claims, 2 Drawing Sheets

SOIL MODIFICATION APPARATUSES AND METHODS OF USING THE SAME

TECHNICAL FIELD

The present invention relates to an apparatus configured to modify wet subgrades and prepare the same for constructions, namely for building roads and/or buildings thereon. The soil modification apparatus spreads soil modification material from a truck having increased traction for maneuvering over the wet subgrades. Methods of using the same are further provided.

BACKGROUND

It is often difficult to construct roads and/or buildings on wet subgrades. Specifically, wet, saturated soils, clays, and other ground materials often pose problems where construction is to occur. A wet subgrade may cause delays as it is often difficult if not impossible to pass heavy construction machinery over the wet subgrade without the machinery becoming entrenched or other stuck. Oftentimes, even if machinery does not become entrenched, deep ruts may be cut into the ground and these ruts may fill with water, making it ever more difficult to pass heavy machinery thereover.

Wet subgrades may be particularly difficult to work with in climes or seasons with heavy rainfall. In many cases, construction projects are often delayed due to wet subgrades and inability to traverse the necessary heavy machinery over saturated grounds. In any construction project, roads are often first to be constructed, as construction cannot occur if heavy machinery cannot pass from one location to another necessary location to complete the construction project. Thus, in many parts of the world, construction projects are done only in dry seasons, or at times with minimal rainfall. Therefore, wet subgrades can significantly increase the cost and extend times of completion of construction projects.

To aid in allowing heavy machinery to pass over wet subgrades, the soil in the wet subgrades may be modified and/or stabilized. Soil modification and stabilization typically involves spreading mineral material, such as, for example, cement powder, fly ash, lime, any other cementitious material, or a combination thereof, onto the wet subgrades to provide a working platform for access and construction equipment. The material is typically spread over the top of the wet subgrade, and subsequently mixed with the saturated soils and clays with a reclaimer. The mixed subgrade is then flattened thereby providing a relatively dry and stable base. The relatively dry and stable base has reduced plasticity and improved compaction, allowing heavy machinery to pass thereover without risk of entrenchment or creating difficult to pass ruts.

One problem facing the industry of soil modification/stabilization is that the aforementioned heavy machinery is typically necessary to pass over wet subgrades to spread the soil modification material. However, without the soil modification, the heavy machinery used to spread the mineral material can itself become entrenched. Moreover, large ruts left in wet subgrades by typical soil modification trucks may make it difficult for later mixing and/or flattening thereby making it difficult for heavy machinery and equipment to pass thereover, even after the soil has been modified and stabilized.

A need, therefore, exists for an improved soil modification apparatus. Specifically, a need exists for an improved soil modification apparatus that does not itself become stuck or entrenched in wet subgrades before it can spread soil modifying mineral material thereon. More specifically, a need exists for an improved soil modification apparatus that minimizes the formation of deep ruts or trenches that may make it difficult for subsequently heavy machinery and equipment to pass thereover.

Typically, soil modification apparatuses are large, heavy machines having a bin or hopper on a rear thereof, a cab, and a set of wheels for maneuvering over the wet subgrade. FIG. 1 illustrates an exemplary prior art soil modification apparatus 10. The soil modification apparatus 10 is typically a truck having a cab 12, a bed 14, a bin or hopper 16. The bin or hopper 16 is typically loaded with soil modification material configured to be utilized to modify and stabilize wet subgrades, and is typically spread from a rear of the truck via a spreader 18. Internal machinery, such as one or more augers internal to the bin or hopper and the spreader move the soil modification material from the bin or hopper to the spreader, thereby spreading the soil modification material onto the wet subgrade.

The soil modification apparatus 10 may further typically have a plurality of wheels 20 on the cab 12 and the bed 14 for moving the truck over the wet subgrades. The wheels 20 often become entrenched in the saturated ground or cause deep ruts or trenches to be formed. A need, therefore, exists for an improved soil modification apparatus that eliminates wheels for improved traction of the same.

Moreover, to minimize the effect the wheels may have on wet subgrades, the bins or hoppers may be only partially filled with soil modification material, as the weight of the soil modification material may exacerbate the entrenchment of the wheels or cutting of deep ruts and trenches into the saturated ground. As such, soil modification material must constantly be replenished, delaying completion of the soil modification project.

A need, therefore, further exists for an improved soil modification apparatus that may utilize a relatively larger bin or hopper thereon. Moreover, a need exists for an improved soil modification apparatus that may fill its bin or hopper to its maximum capacity, thereby minimizing stoppages for refilling during use thereof.

SUMMARY OF THE INVENTION

The present invention relates to an apparatus configured to modify wet subgrades and prepare the same for constructions, namely for building roads and/or buildings thereon. The soil modification apparatus spreads soil modification material from a truck having increased traction for maneuvering over the wet subgrades. Methods of using the same are further provided.

To this end, in an embodiment of the present invention, a soil modification apparatus is provided. The soil modification apparatus comprises: a truck comprising a cab on a front thereof; a bed behind the cab; a hopper on the bed, the hopper configured to hold a soil modification material therein; a spreader connected to the hopper and disposed on a rear of the hopper, the spreader configured to laterally spread the soil modification material from the hopper; and at least one track disposed on a bottom of the truck configured to move the truck.

In an embodiment, the soil modification apparatus comprises a first track disposed on a first side of the truck; and a second track disposed on a second side of the truck, wherein the first track and the second track are independently controllable for independent movement of each.

In an embodiment, the track comprises a plurality of wheels, a control sprocket, and a track tread configured to travel over the plurality of wheels and the control sprocket.

In an embodiment, the soil modification apparatus further comprises: a weight disposed on the cab, wherein the weight is configured to balance the weight on the rear of the truck.

In an embodiment, the weight comprises a solid material.

In an embodiment, the weight comprises a bin filled with a weight material.

In an embodiment, the weight material is fluid.

In an embodiment, the weight material is selected from the group consisting of sand, water, soil modification material, and combinations thereof.

In an embodiment, the bin comprises an apparatus for moving the weight material into or out of the bin.

In an embodiment, the soil modification apparatus further comprises: a controller within the cab for controlling the spread of the soil modification material from the spreader.

In an alternate embodiment of the present invention, a method of spreading soil modification material is provided. The method comprises the steps of: providing a soil modification apparatus comprising a truck comprising a cab on a front thereof, a bed behind the cab, a hopper on the bed, the hopper holding a soil modification material therein, a spreader connected to the hopper and disposed on a rear of the hopper, the spreader configured to laterally spread the soil modification material from the hopper, and at least one track disposed on a bottom of the truck configured to move the truck; and driving the soil modification apparatus onto a wet subgrade; and spreading the soil modification material onto the wet subgrade.

In an embodiment, the truck further comprises a first track disposed on a first side of the truck, and a second track disposed on a second side of the truck, wherein the first track and the second track are independently controllable for independent movement of each.

In an embodiment, the track comprises a plurality of wheels, a control sprocket, and a track tread configured to travel over the plurality of wheels and the control sprocket.

In an embodiment, the method further comprises the step of: balancing the truck by adding a weight to the front of the truck.

In an embodiment, the weight is added to the front of the cab.

In an embodiment, the weight is solid.

In an embodiment, the cab comprises a bin, and further wherein the weight is added to the bin.

In an embodiment, the method further comprises the step of: removing an amount of the weight from the front of the truck after an amount of soil modification material is removed from the hopper during use thereof.

In an embodiment, the cab comprises a bin and the weight is contained within the bin, wherein the weight is fluid, and further wherein the bin comprises a mechanism for removing the amount of the weight from the bin when the truck is in use.

In an embodiment, the method further comprises the step of: removing the amount of the weight from the bin via the mechanism as the soil modification material is spread from the spreader to maintain balance of the truck during use thereof.

It is, therefore, an advantage and objective of the present invention to provide an improved soil modification apparatus.

Specifically, it is an advantage and objective of the present invention to provide an improved soil modification apparatus that does not itself become stuck or entrenched in wet subgrades before it can spread soil modifying mineral material thereon.

More specifically, it is an advantage and objective of the present invention to provide an improved soil modification apparatus that minimizes the formation of deep ruts or trenches that may make it difficult for subsequently heavy machinery and equipment to pass thereover.

Moreover, it is an advantage and objective of the present invention to provide an improved soil modification apparatus that eliminates wheels for improved traction of the same.

Further, it is an advantage and objective of the present invention to provide an improved soil modification apparatus that may utilize a relatively larger bin or hopper thereon.

Still further, it is an advantage and objective of the present invention to provide an improved soil modification apparatus that may fill its bin or hopper to its maximum capacity, thereby minimizing stoppages for refilling during use thereof.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to an apparatus configured to modify wet subgrades and prepare the same for constructions, namely for building roads and/or buildings thereon. The soil modification apparatus spreads soil modification material from a truck having increased traction for maneuvering over the wet subgrades. Methods of using the same are further provided.

Figure 1:
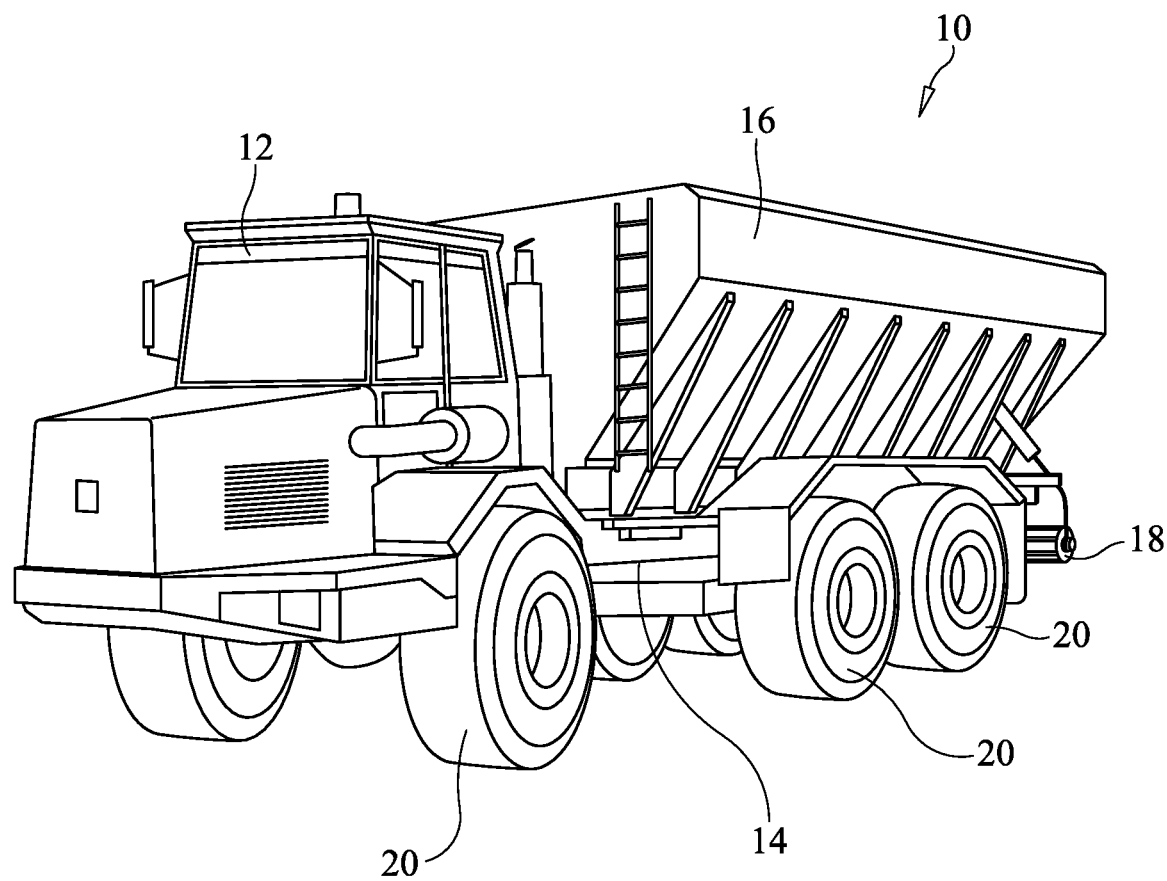
FIG. 1 illustrates a perspective view of a prior art soil modification apparatus, known as a spreader, configured to spread mineral material onto wet subgrades.
Figure 2:
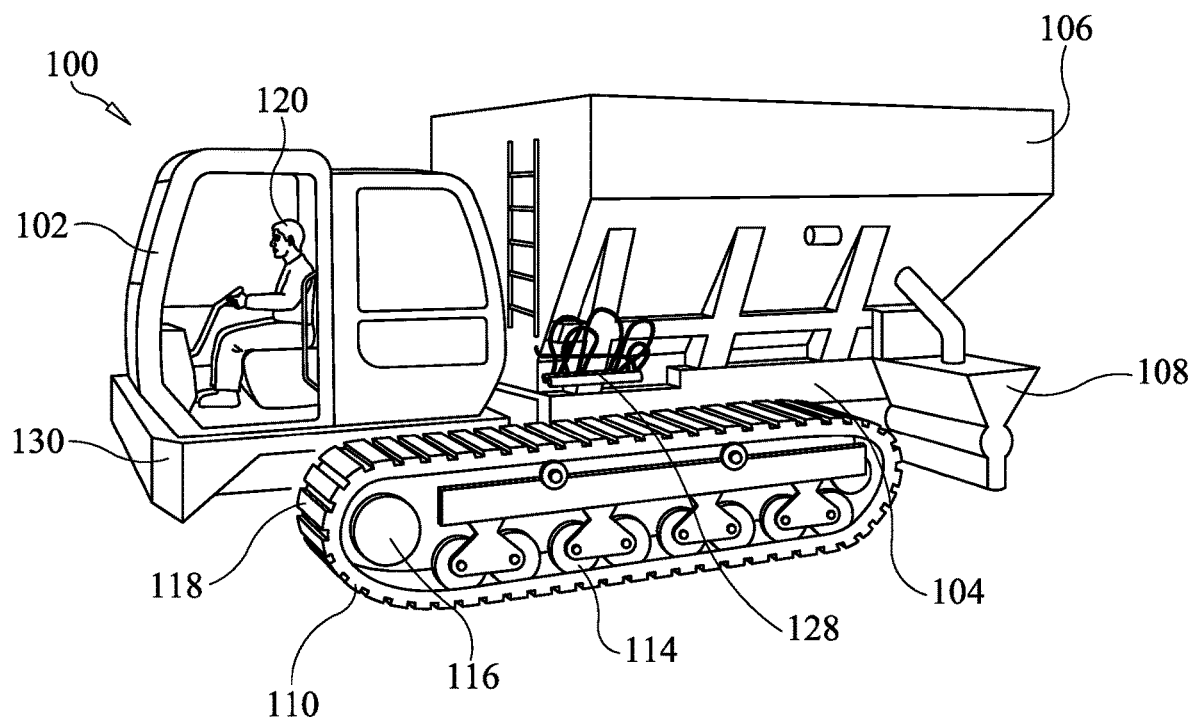
FIG. 2 illustrates a perspective view of a soil modification apparatus in an embodiment of the present invention.

Now referring to the figures, wherein like numerals refer to like parts, FIG. 2 illustrates a soil modification apparatus 100 in an embodiment of the present invention. The soil modification apparatus 100 comprises, generally, a cab 102, a bed 104, a bin or hopper 106, and a spreader 108, in an embodiment of the present invention.

The cab 102 comprises a compartment for a human user 120 therein, further having controls for controlling the soil modification apparatus 100. The bed 104 holds the bin or hopper 106 thereon, which may be configured as a generally hollw "V-shaped" prism for holding soil modification material therein, such as cement, fly ash, lime, other mineral or cementitious material, or combinations thereof. The bin or hopper 106 may be filled with the soil modification material, either by pumping the same into the bin or hopper 106 through a port, or by dumping the same through an access in the top thereof.

Figure 3:
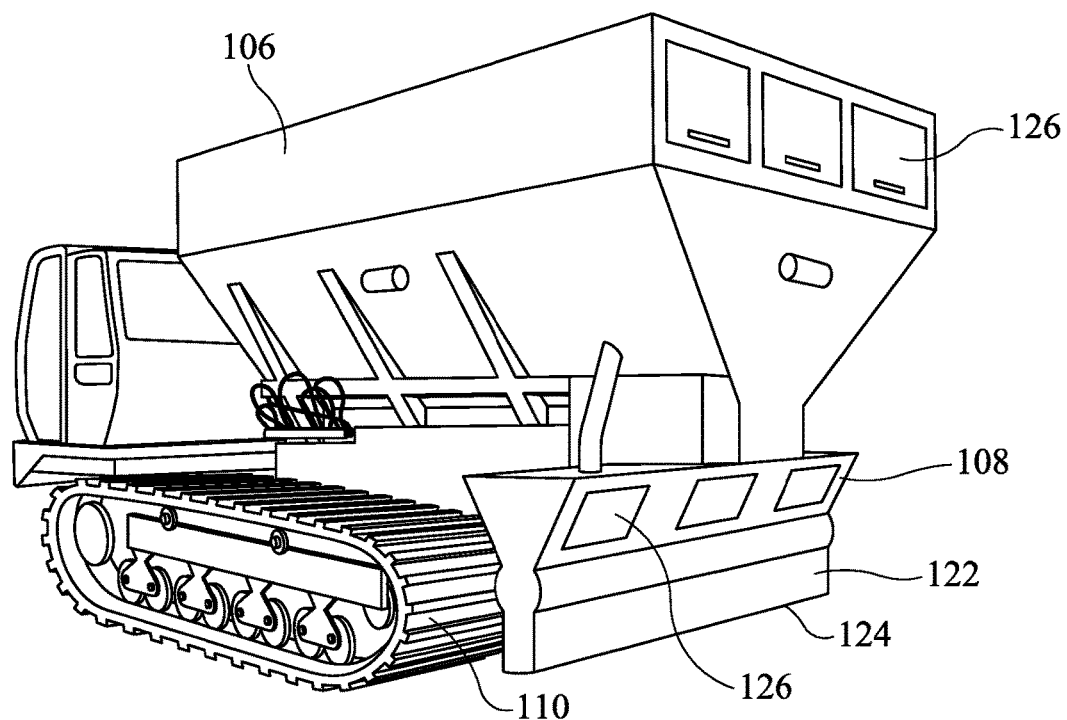
FIG. 3 illustrates a rear perspective view of a soil modification apparatus in an embodiment of the present invention.

The soil modification material may be held in the bin or hopper 106 and transported to a wet subgrade for spreading thereon. When in place, the soil modification material within the bin or hopper 106 may be moved to the spreader 108 disposed on a rear side thereof (as further illustrated in FIG. 3). The spreader 108 may be laterally positioned in the shape of a hollow V-shaped prism, having an egress passage 122, formed by, for example, flaps, having a slot 124 running across a bottom thereof. Soil modification material that may be moved into the spreader 108 may be distributed relatively evenly across the spreader 108 and subsequently dumped through the egress slot 124 on the bottom thereof, thereby spreading the soil modification material onto the wet subgrade.

The bin or hopper 106 and the spreader 108 may have one or more access ports 126 for gaining access thereto, for placement of soil modification material, for cleaning the same, for accessing the soil modification material movement machinery therein, or for any other purpose. Further, the bin or hopper 106 may be V-shaped to allow the soil modification material to naturally fall by gravity to a bottom thereof so that the soil modification material may be moved by the soil modification material movement machinery, typically an auger, therein. Likewise, the spreader 108 may further have soil modification material movement machinery therein to move the soil modification material from a central point, fed by the auger within the bin or hopper 106, to terminal ends thereof for relatively even lateral spreading of the soil modification material onto the wet subgrades when necessary.

As previously noted, controls may be contained within the cab 102 for controlling the movement of the apparatus 100, and for controlling various aspects of the apparatus 100, namely the movement of the soil modification material from within the bin or hopper 106 to the spreader 108 for spreading onto the wet subgrade when needed. Likewise, override controls 128 may be positioned outside the cab and near the bin or hopper 106 for manual control of the various aspects thereof, namely the machinery therein for moving the soil modification material to and out the spreader 108.

In a preferred embodiment of the present invention, the soil modification apparatus comprises one or more tracks 110. Preferably, a pair of tracks 110 are positioned on opposite sides of the apparatus 100 for aiding in moving the apparatus 100 over wet and rutted subgrades. As illustrated in FIG. 2, the tracks 110 may comprise a plurality of internal wheels 114 and a drive sprocket 116 over which a track tread 118 travels. Each of the tracks 110 disposed on opposite sides of the apparatus 100 may be independently controlled, providing forward, rearward, left, and right movement of the apparatus 100 over the ground, for spreading of the soil modification material thereon. Typically, the human user 120 within the cab 102 controls the apparatus and its movement, but the apparatus 100 may also be controller remotely, as needed.

As illustrated in FIG. 2, the tracks 110 may be positioned so that the track treads 118 travel under both the cab 102 and the bed 104, thereby providing stability and balance thereof, especially when filled with soil modification material. However, considering the weight of the soil modification material and the limitations in balance of the apparatus 100 when completely filled with soil modification material, one or more weights 130 may be placed on a front of the cab 102 to better balance the apparatus 100 when in use. The one or more weights 130 may be added or removed to the front of the cab 102, or in any other location that balances the apparatus 100 when in use.

The one or more weights 130 may be solid weights, made from typical weight material, such as heavy metal or other like material. Alternatively, the weights 130 may comprise material that may be filled and/or emptied as needed, such as sand, water, or other like material. This may be useful during the spread of soil modification material onto wet subgrades to maintain the proper balance of the apparatus 100. For example, when the apparatus 100 is filled with soil modification material, the back-end of the apparatus 100 may be very heavy, which may incline the apparatus to tip backwards when in use, especially when the apparatus 100 is used on a grade. The weights 130 may ensure that the apparatus maintains balance.

Therefore, when apparatus 100 is filled completely with soil modification material, relatively heavy weights may be used to maintain balance. As the soil modification material empties from the bin or hopper 106, the weights 130 may cause the front end of the apparatus 100 to be too heavy, causing imbalance. Therefore, weights may need to be removed therefrom during use to maintain proper balance as the soil modification material is spread therefrom. A user may do so by manually removing weights therefrom; however, the weights being quite heavy will typically need to be removed with a different machine.

In an alternate embodiment, the weights 130 may be water, sand or other fill material (even soil modification material) that may maintain balance. As the weight of the soil modification material within the bin or hopper 105 decreases, the weights 130 in the front of the cab 102 may likewise be emptied, either manually or automatically, to maintain proper balance of the apparatus 100 so that it may continue to be used without interruption.

In yet another embodiment of the present invention, the weights 130 may contain a secondary bin or hopper for holding soil modification material therein for spreading separately from a front of the apparatus 100 so that soil modification material may be spread before interaction of the tracks 110 with the wet subgrade, thereby aiding in traction thereof. Thus, the soil modification material itself may balance the apparatus with the primary bin or hopper on the bed 104, and further may be drawn down as the soil modification material is drawn down from the primary bin or hopper 106, and may further provide additional traction by spreading the material in front of the tracks 110. Alternatively, a passage may connect the secondary bin or hopper to the primary bin or hopper 106 so that when the soil modification material is drawn down from the primary bin or hopper 106, weight may be transferred from the front of the apparatus 100 to the rear when in use, thereby maintaining proper balance.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are non-limiting, and it should be noted that claim limitations presented herein are not meant to describe the invention as a whole. Moreover, the invention illustratively disclosed herein suitably may be practiced in the absence of any element which is not specifically disclosed herein.

I claim:

1. A soil modification apparatus comprising:
a truck comprising a cab on a front thereof;
a bed behind the cab;

a hopper on the bed, the hopper configured to hold a soil modification powder therein;

a spreader connected to the hopper and disposed on a rear of the hopper, the spreader configured to laterally spread the soil modification powder from the hopper;

at least one track disposed on a bottom of the truck configured to move the truck, wherein a first weighted material is disposed on the cab in a first configuration, wherein the first weight material is configured to balance the soil modification powder in the hopper on the bed behind the cab, and wherein a second weighted material of a different weight than the first weighted material is disposed on the cab in a second configuration, wherein the second weighted material is configured to balance the soil modification powder in the hopper after an amount of soil modification powder is applied to soil from the hopper.

2. The soil modification apparatus of claim 1 comprising:
a first track disposed on a first side of the truck; and
a second track disposed on a second side of the truck, wherein the first track and the second track are independently controllable for independent movement of each.

3. The soil modification apparatus of claim 1 wherein the track comprises a plurality of wheels, a control sprocket, and a track tread configured to travel over the plurality of wheels and the control sprocket.

4. The soil modification apparatus of claim 1 wherein the first weighted material comprises a solid material.

5. The soil modification apparatus of claim 1 wherein the first weighted material comprises a bin filled with a weight material.

6. The soil modification apparatus of claim 5 wherein the weight material is fluid.

7. The soil modification apparatus of claim 5 wherein the weight material is selected from the group consisting of sand, water, soil modification material, and combinations thereof.

8. The soil modification apparatus of claim 5 wherein the bin comprises an apparatus for moving the weight material into or out of the bin.

9. The soil modification apparatus of claim 1 further comprising:
a controller within the cab for controlling the spread of the soil modification material from the spreader.

10. A method of spreading soil modification powder, the method comprising the steps of:
providing a soil modification apparatus comprising a truck comprising a cab on a front thereof, a bed behind the cab, a hopper on the bed, the hopper holding a soil modification powder therein, a spreader connected to the hopper and disposed on a rear of the hopper, the spreader configured to laterally spread the soil modification powder from the hopper, and at least one track disposed on a bottom of the truck configured to move the truck, wherein a first weighted material is disposed on the cab in a first configuration, wherein the first weight material is configured to balance the soil modification powder in the hopper on the bed behind the cab;

driving the soil modification apparatus onto a wet subgrade;

spreading the soil modification powder onto the wet subgrade; and changing the first weighted material to a second weighted material of a different weight after spreading an amount of soil modification powder on the wet subgrade so as to balance remaining soil modification powder in the hopper on the bed after the amount of soil modification powder is spread on the wet subgrade.

11. The method of claim 10 wherein the truck further comprises a first track disposed on a first side of the truck, and a second track disposed on a second side of the truck, wherein the first track and the second track are independently controllable for independent movement of each.

12. The method of claim 10 wherein the track comprises a plurality of wheels, a control sprocket, and a track tread configured to travel over the plurality of wheels and the control sprocket.

13. The method of claim 10 wherein the first weighted material is disposed on the front of the cab.

14. The method of claim 10 wherein the first weighted material is solid.

15. The method of claim 10 wherein the cab comprises a bin, and further wherein the first weighted material is disposed in the bin.

16. The method of claim 10 wherein the cab comprises a bin and the first weighted material is contained within the bin, wherein the first weighted material is fluid, and further wherein the bin comprises a mechanism for removing an amount of the first weighted material from the bin when the truck is in use.

17. The method of claim 16 further comprising the step of:
removing the amount of the first weighted material from the bin via the mechanism as the soil modification powder is spread from the spreader to maintain balance of the truck during use thereof.

* * * * *